United States Patent
Holmes et al.

(10) Patent No.: US 12,348,846 B2
(45) Date of Patent: Jul. 1, 2025

(54) METHOD AND APPARATUS FOR EXTENDING OPERATIONAL AVAILABILITY FOR TERRESTRIAL OPTICAL SURVEILLANCE SYSTEMS

(71) Applicant: The Boeing Company, Chicago, IL (US)

(72) Inventors: Richard B. Holmes, Albuquerque, NM (US); Steven F. Griffin, Kihei, HI (US)

(73) Assignee: The Boeing Company, Arlington, VA (US)

( * ) Notice: Subject to any disclaimer, the term of this patent is extended or adjusted under 35 U.S.C. 154(b) by 791 days.

(21) Appl. No.: 17/499,564

(22) Filed: Oct. 12, 2021

(65) Prior Publication Data

US 2023/0164410 A1   May 25, 2023

Related U.S. Application Data

(60) Provisional application No. 63/134,088, filed on Jan. 5, 2021.

(51) Int. Cl.
| | |
|---|---|
| *H04N 23/55* | (2023.01) |
| *G02B 7/18* | (2021.01) |
| *G02B 7/183* | (2021.01) |
| *G02B 23/06* | (2006.01) |
| *G02B 23/16* | (2006.01) |
| *H04N 23/51* | (2023.01) |
| *H04N 23/52* | (2023.01) |

(52) U.S. Cl.
CPC ............. *H04N 23/55* (2023.01); *G02B 7/181* (2013.01); *G02B 7/183* (2013.01); *G02B 23/06* (2013.01); *G02B 23/16* (2013.01); *H04N 23/51* (2023.01); *H04N 23/52* (2023.01)

(58) Field of Classification Search
CPC ........ H04N 23/55; H04N 23/51; H04N 23/52; G02B 7/181; G02B 7/183; G02B 23/06; G02B 23/16; G02B 27/0006
USPC ......................................................... 359/363
See application file for complete search history.

(56) References Cited

U.S. PATENT DOCUMENTS

| | | | | |
|---|---|---|---|---|
| 4,799,779 A | * | 1/1989 | Mesmer | A61B 46/10 206/316.1 |
| 6,333,826 B1 | * | 12/2001 | Charles | G02B 13/06 359/728 |
| 2005/0244932 A1 | * | 11/2005 | Harding | G01N 21/648 435/91.1 |
| 2006/0029377 A1 | * | 2/2006 | Stavely | G03B 17/02 348/E5.045 |

(Continued)

OTHER PUBLICATIONS

Takatoshi Sanjo, Wide-angle camera-shooting device and wide-angle camera-shooting display device; CN 1289057 (English translation included) (Year: 2001).*

(Continued)

*Primary Examiner* — Tuyen Tra
*Assistant Examiner* — Rahman Abdur
(74) *Attorney, Agent, or Firm* — Harrity & Harrity, LLP

(57) ABSTRACT

A retrofittable subassembly that enhances the operational availability of a terrestrial optical surveillance system is disclosed. In various embodiments, the subassembly comprises a diffusely reflective and insulating external cover, a highly uniform plate-glass cover, an wide angle FOV camera and a passive thermal control system.

23 Claims, 9 Drawing Sheets

(56) References Cited

U.S. PATENT DOCUMENTS

2012/0257275 A1* 10/2012 Hull ..................... G02B 23/16
359/399
2017/0192257 A1* 7/2017 Branda ............ B29D 11/00634

OTHER PUBLICATIONS

Roggemann, M.C., et al., "Daytime Image Measurement and Reconstruction for Space Situational Awareness Applications (Paper ID No. 4231324)", Pacific Defense Solutions LLC, 2010, pp. 1-13.

McGraw, J.T., et al., "Ground-based observatory operations optimized and enhanced by direct atmospheric measurements", Proceedings of SPIE, 2010, pp. 773929-1-773929-18, vol. 7739.

Calef, B., "Iteratively Reweighted Blind Deconvolution", IEEE International Conference on Image Processing, Sep. 2013, pp. 1-4.

Bruck, R., et al., "Optical Ground Based Space Surveillance Obscured Sky Mitigation", Advanced Maui Optical and Space Surveillance Technologies Conference (AMOS), Aug. 28, 2017, pp. 1-10.

"Gentoo™ Anti-Corrosion & Easy-Cleaning Coating", Ultratech International, Inc., pp. 1-15, https://www.spillcontainment.com/products/gentoo-coating.

\* cited by examiner

METHOD AND APPARATUS FOR EXTENDING OPERATIONAL AVAILABILITY FOR TERRESTRIAL OPTICAL SURVEILLANCE SYSTEMS

CROSS-REFERENCE TO RELATED APPLICATIONS

This application claims benefit of U.S. Provisional Patent Application No. 63/134,088, entitled "METHOD AND APPARATUS FOR EXTENDING OPERATIONAL AVAILABILITY FOR TERRESTRIAL OPTICAL SURVEILLANCE SYSTEMS," by Richard B. Holmes and Steven F. Griffin, filed Jan. 5, 2021, which application is hereby incorporated by reference herein.

STATEMENT OF RIGHTS OWNED

This invention was made with Government support under contract No. FA945116D0001 awarded by the Department of Defense. The Government has certain rights in this invention.

BACKGROUND

1. Field

The present disclosure relates to systems and methods for surveilling objects in the sky and in particular to a system and method for improving operational availability for such systems.

2. Description of the Related Art

The utility of optical systems is limited by weather, sky background, and atmospheric turbulence. For this reason, radar is often a preferred means for surveillance applications, where availability and persistence are critical. In recent years, significant progress has been made on mitigation of the impact of atmospheric turbulence. These mitigations include adaptive optics (see, for example, J. W. Hardy, Adaptive Optics for Astronomical Telescopes, Oxford University Press, New York, 1998, incorporated by reference herein), image reconstruction (see, for example, B. Calef, "Iteratively Reweighted Blind Deconvolution," AMOS Conference, 2013, incorporated by reference herein), and retractable domes during observations. The latter is beneficial because it eliminates the issue of "dome seeing" due to turbulence caused by different temperatures inside and outside a dome, causing high levels of turbulence at the dome opening. However, when domes are removed, the telescope suffers a greater impact due to sky background, solar irradiance, and adverse weather. Furthermore, when there is no dome, the telescope structure is exposed to temperature excursions of the external environment and due to solar irradiation, both of which can cause deformation of the optical system and added aberrations. Further, the telescope is at risk of weather exposure if for some reason the dome cannot close.

Further, in high-humidity conditions even a dome may be insufficient to protect the optical system. In such cases the windows have been put in the open portion of the dome (see, for example, R. Bruck, F. Lundy, "Optical Ground Based Space Surveillance Obscured Sky Mitigation," AMOS Conference, 2018, incorporated by reference herein). Such windows are necessarily curved, causing optical degradation. Windows have also been found to exhibit seeing effects due to thermal variations. This results in some distortion of wave front.

Moreover, while the dome addresses the issues of partial bad weather, in which the optical system may not be in particularly poor conditions, there are variable conditions along various lines of sight from the telescope. The issue of daytime operation can be addressed by the well-known approach of operation at a longer wavelength. At longer wavelengths, the sky background is known to be greatly diminished. The presence of high winds can also reduce on-sky availability. Optical systems on the ground, e.g., ground-based telescopes, can now operate in higher winds while maintaining image quality due to adaptive optics and improved image reconstruction techniques. The limit of operation in high winds is often now the wind-induced jitter on the telescope. Such jitter is often exacerbated by domeless operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for performing optical surveillance. One embodiment is evidenced by an optical surveillance system that comprises a primary mirror, a secondary mirror, a support structure extending between the primary mirror and the secondary mirror, the support structure retaining the secondary mirror along an optical axis of the primary mirror, the support structure comprising a head ring disposed proximate an aperture of the optical surveillance system and a first flexible cover affixed to the support structure, the cover having a first end at least partially sealingly disposed around a periphery of the primary mirror and a second end at least partially sealingly disposed around the head ring. In one embodiment, the support structure comprises a trestle frame disposed about the optical axis of the primary mirror, and the cover is affixed to an external surface of the trestle frame axially about the frame. In another embodiment, the cover is at least partially composed of a substantially opaque, thermally insulating fabric having a diffusively reflective outer surface and an optically absorbing inner surface.

The optical surveillance system may also comprise an optically transparent second cover, disposed at the first end of the first cover. Further, the optical the transparent second cover may be substantially sealingly disposed at the first end of the first cover to prevent flow of air from within the first cover to an external environment of the optical surveillance system, for example comprised of optically uniform plate glass. Such plate glass may also comprise an anti-reflective coating on an outer surface of the uniform plate glass and an inner surface of the uniform plate glass, and/or a hydrophobic coating on the outer surface of the uniform plate glass. The uniform plate glass may also be auto-dimming to light at solar wavelengths.

The optical surveillance system may also comprise a ventilation system, pneumatically coupled to an interior volume of the first cover. The ventilation system creates greater air pressure within the interior volume of the first cover than exterior to the volume within the first cover, and so air pressure is vented from the interior volume to the exterior of the first cover in a region of the first cover that is proximate the primary mirror.

The optical surveillance system may also comprise a camera, which can be used to identify surveillance opportunities, cancel atmospheric turbulence, or account for wind-induced jitter.

Also disclosed is a method of performing surveillance with an optical surveillance system. The optical surveillance system comprises a telescope having a primary mirror, a secondary mirror, a support structure extending between the primary mirror and the secondary mirror, and a camera having an optical axis aligned with an optical axis of the telescope, the telescope having a first field of view and the camera having a second field of view greater than the first field of view. Several methods are disclosed including a first method for directing the telescope to surveil mobile objects during predicted opportunities. This method comprises surveilling the second field of view of the sky, using the camera, identifying, using the surveilled second field of view, one or more viewable areas of the sky that are substantially unobstructed by one or more temporally varying obstructions, predicting, using the identified one or more viewable areas of the sky, opportunities to surveil a mobile object in the first field of view of the telescope, and directing the telescope to surveil the mobile object during the predicted opportunities.

A second method is a method for estimating atmospheric turbulence. This method comprises surveilling one or more stars, each of the one or more stars within a respective angular distance of the optical axis of the telescope using the camera, determining atmospheric turbulence at each of the respective angular distances from the optical axis of the telescope using the surveilled one or more stars, and estimating the determined atmospheric turbulence in the first field of view.

A third method is a method for accounting for wind-induced jitter. This method comprises surveilling one or more stars using the camera, determining wind induced jitter using the surveilled one or more stars, and compensating for the determined jitter in the first field of view.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
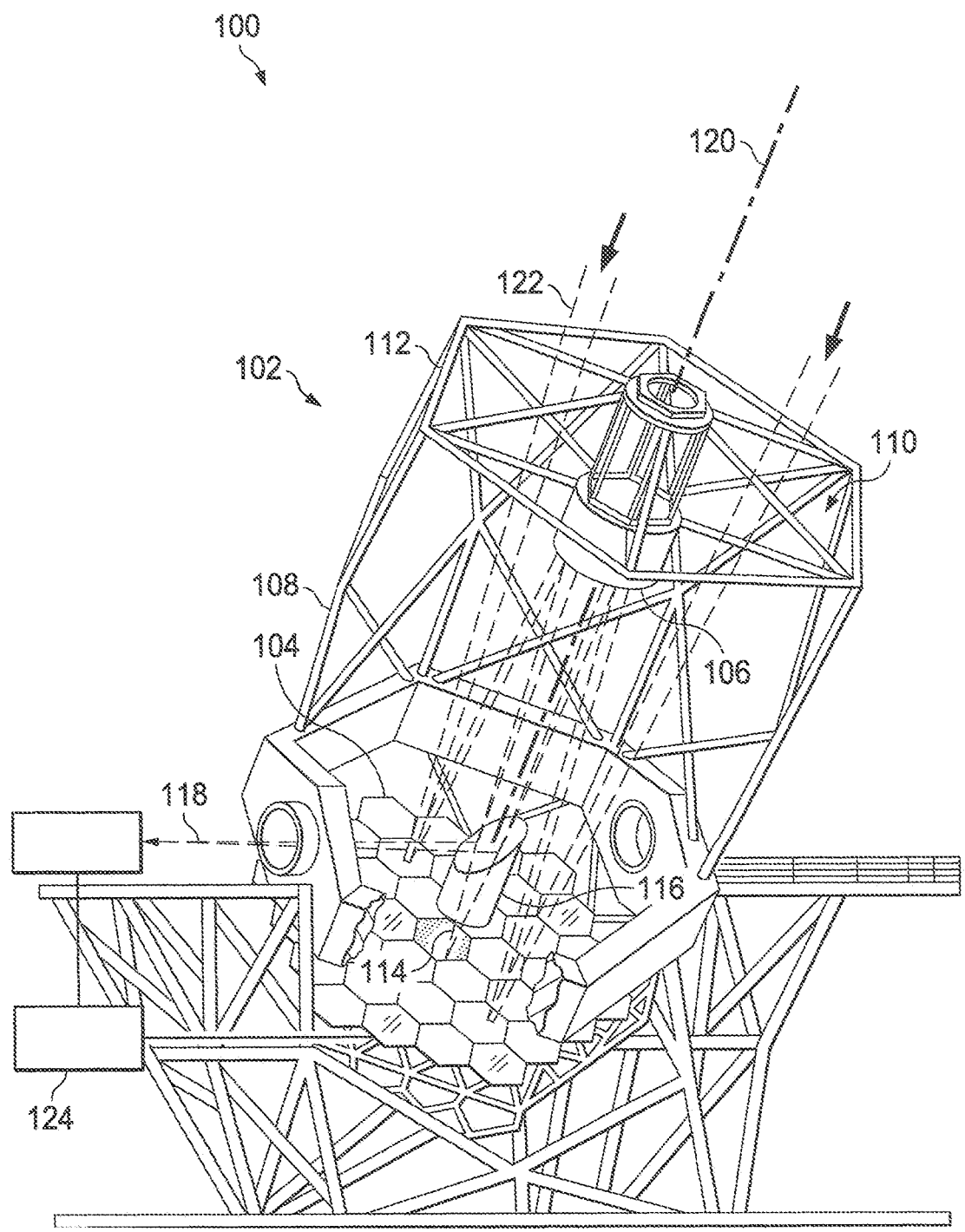
FIG. 1 is a diagram of an exemplary optical surveillance system.

FIG. 1 is a diagram of an exemplary optical surveillance system 100. The optical surveillance system 100 comprises a telescope 102 that includes a primary mirror 104, a secondary mirror 106, and a support structure 108. The support structure extends between the primary mirror 104 and the secondary mirror 106 along the optical axis of the primary mirror 104. In the illustrated embodiment, the support structure 108 comprises a head ring 112. The head ring 112 comprises one or more support structure segments, arranged in a polygon to form an aperture 110. In the illustrated embodiment, the head ring comprises a plurality of linear support structure segments, arranged to form a polygon that forms the aperture 110 of the telescope 102.

FIG. 1 also illustrates the path of light 122 entering the telescope 102. As shown, light enters the aperture 110 and is reflected off the primary mirror 104 towards the secondary mirror 106. The secondary mirror 106 reflects the light to a light sensor such as a camera disposed at the Cassegrain focus 114, or in embodiments having a tertiary mirror 116, towards the Nasmyth focus 118 of another camera. In the illustrated embodiment, the primary mirror 104 comprises a plurality of segments, arranged to present a parabolic surface to the aperture 110. The optical surveillance system 100 may also comprise one or more system processors 124 communicatively coupled to other elements of the system, including the primary mirror 104, secondary mirror 106, all sky camera 402, fan 804, sensor arrays in the optical path that form surveillance images, and any motors or actuators that manipulate the telescope 102 to orient it a desired direction. The system processor 104 is used to perform computational and logical operations described herein, including those using the all sky camera 402, and controlling the fan 804 to provide external positive pressure flow.

Overview

This disclosure presents systems and methods to mitigate the issues discussed above. Such systems and methods include (a) an external cover, (b) a plate-glass front cover, (c) an all-sky viewer, and (d) external positive pressure flow at the bottom of the external cover, as well as methods for using these systems.

Retrofittable External Cover

Figure 2:
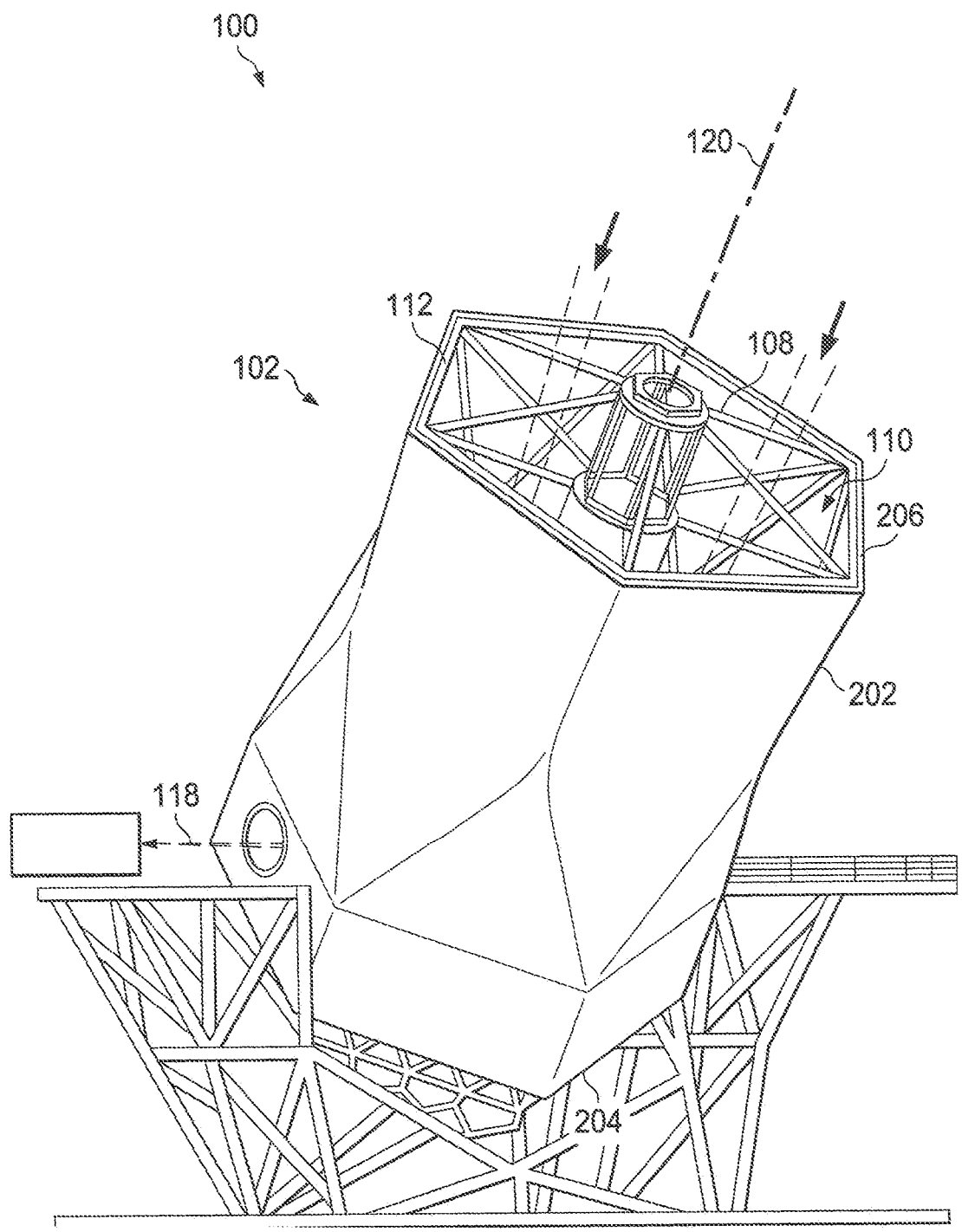
FIG. 2 is a diagram depicting one embodiment of an improved optical surveillance system having a cover.

FIG. 2 is a diagram depicting one embodiment of an improved optical surveillance system 100. In this embodiment, the optical surveillance system includes a flexible fabric cover 202 affixed to the support structure 108. In one embodiment, the cover 202 is flexible and has a first end 204 at least partially sealingly disposed about the primary mirror 104 and a second end 206 at least partially sealingly disposed about the head ring 112. In the illustrated embodiment, the support structure 108 comprises a trestle frame disposed about the optical axis 120 of the primary mirror 104, and the cover 202 is affixed to an external surface of the trestle frame. Placing the cover 202 on the inside of the frame of the support structure 108 is sub-optimal, because such placement may interfere with the outer ring of adaptive optical actuators. Further, the trusses of the support structure 108 are exposed to solar insolation when the fabric is on the inside, causing localized warming of the support of the secondary mirror 106 impacting the stability of the secondary mirror 106. Disposing the cover 202 on the outside of the frame of the support structure 108 also protects the trusses of the frame of the support structure 108 from the elements.

In one embodiment, the cover 202 is at least partially composed of a diffusively reflective outer surface and a thermally insulating fabric. That the cover 202 is insulative and on the outside of the external trusses helps protect the telescope 102 structure from uneven radiated heating from the Sun. Uneven radiated heating can result in low order wave front error and often causes constantly-varying focus throughout the daylight hours. The cover 202 may also have an opaque and diffusively reflective outer surface (to avoid solar heating), and an optically absorbing (for example, black) inner surface to reduce stray light.

In another embodiment, the cover 202 comprises a plurality of substantially opaque, thermally insulating plates. Each such plate has a diffusively reflective outer surface and an optically absorbing inner surface and is mounted to the trestle frame. For example, each such plate can be attached to trusses of the trestle frame to cover open space between segments of the trestle frame.

The external cover 202 should not be loose in order to avoid flapping in wind, which would cause jitter. The external cover 202 could be made of a thick synthetic fabric or very lightweight plates that attach to the trusses. Such lightweight fabric or very low mass structural cover 202 has the advantage of not allowing high frequency jitter excitation from the wind, acting to isolate the telescope line of sight at the optical axis 120. The cover 202 induces additional static loading on the elevation and azimuthal axes, but there is usually margin in the actuation force. This cover should also accommodate any acquisition or tracking cameras that might be used by the telescope.

Front Cover

Figure 3:
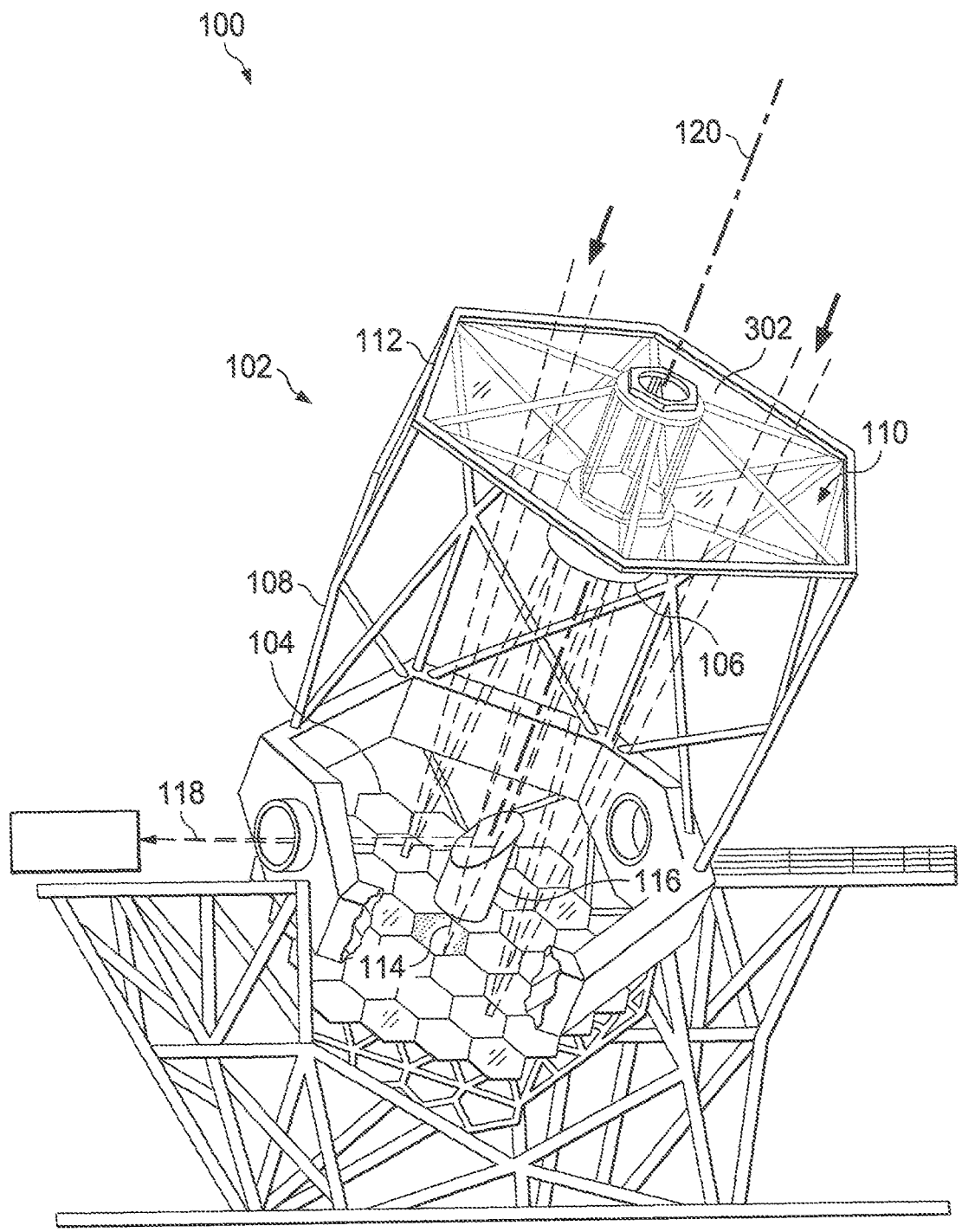
FIG. 3 is a diagram presenting another embodiment of the improved optical surveillance system having a front cover.

FIG. 3 is a diagram presenting another embodiment of the optical surveillance system 100. In this embodiment, an optically transparent front cover 302 is disposed at the first end of the first cover 202, adjacent to the aperture 110 of the telescope 102. In one embodiment, the front cover 302 is comprised of a durable plate glass that goes upon the head ring 112 that holds the secondary mirror 106. This front cover 302 should also be made of a glass that is highly uniform to avoid introduction of aberrations in the optical path. This front cover 302 is mounted so as to minimize stresses and strains from the mount points, and maybe kinematically mounted. In this embodiment, the optically transparent front cover 302 is substantially sealingly disposed (for example by permitting minimal free space between the front cover 302 and the head ring 112) at the first and of the first cover 202 to prevent or minimize flow of air from within the first cover 202 to an external environment of the optical surveillance system 100.

In one embodiment, an anti-reflective coating is applied to both the front and back surface of the front cover 302 to minimize losses. Finally, the front cover 302 can have a clear, super-hydrophobic coating on its front surface, such as GENTOO COATING, made by ULTRATECH INTERNATIONAL, INC. Such a coating sheds any water when the tilt of the cover 302 is more than about 5 degrees from horizontal. Finally, in one embodiment the front cover 302 is comprised of glass that is auto-dimming at solar wavelengths, thus allowing shuttering of the primary mirror for safety in the event of a mount runaway that points the telescope very close to the Sun.

All-Sky Camera

Figure 4A:
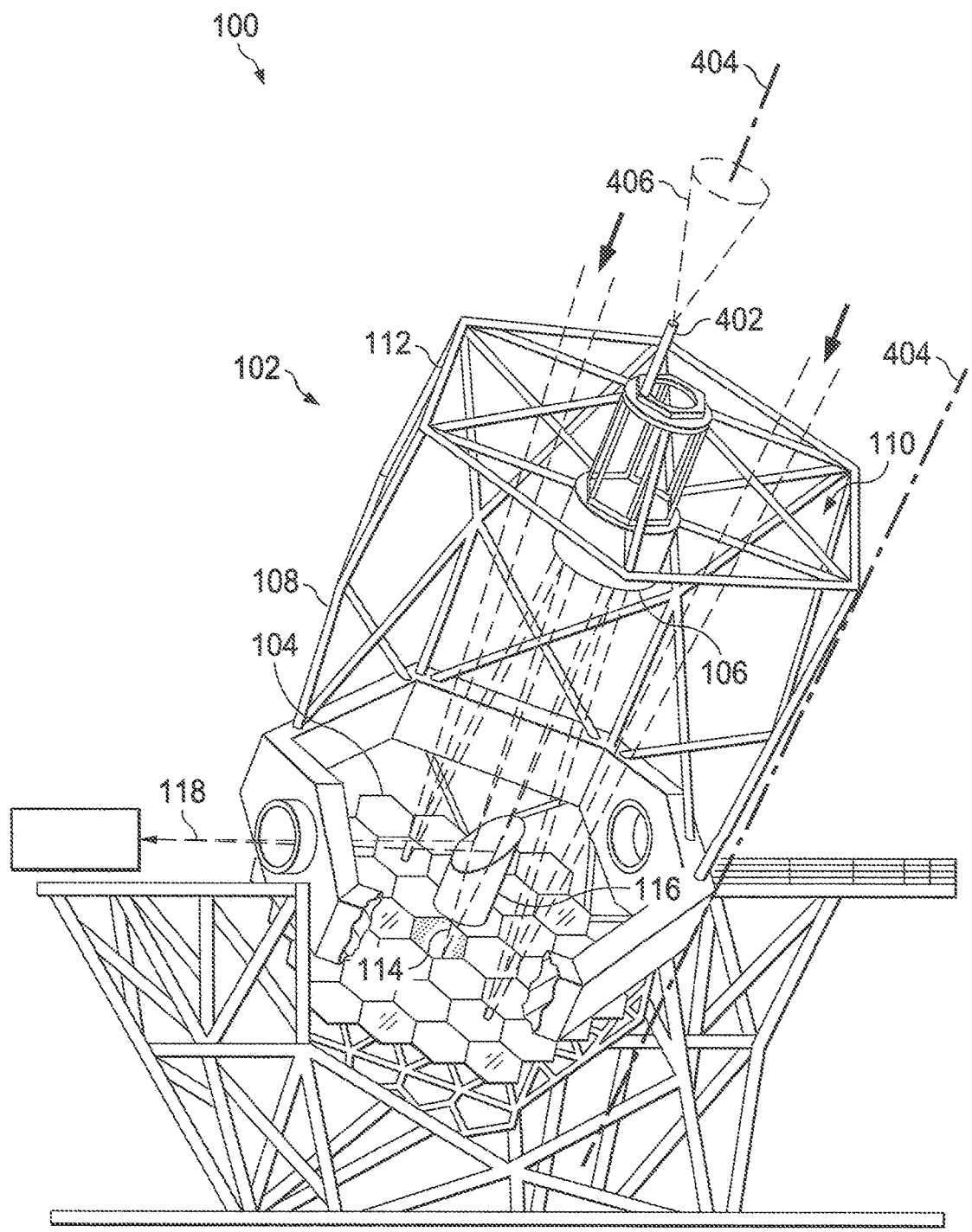
FIGS. 4A and 4B are diagrams presenting another embodiment of the optical surveillance system having a camera.
Figure 4B:
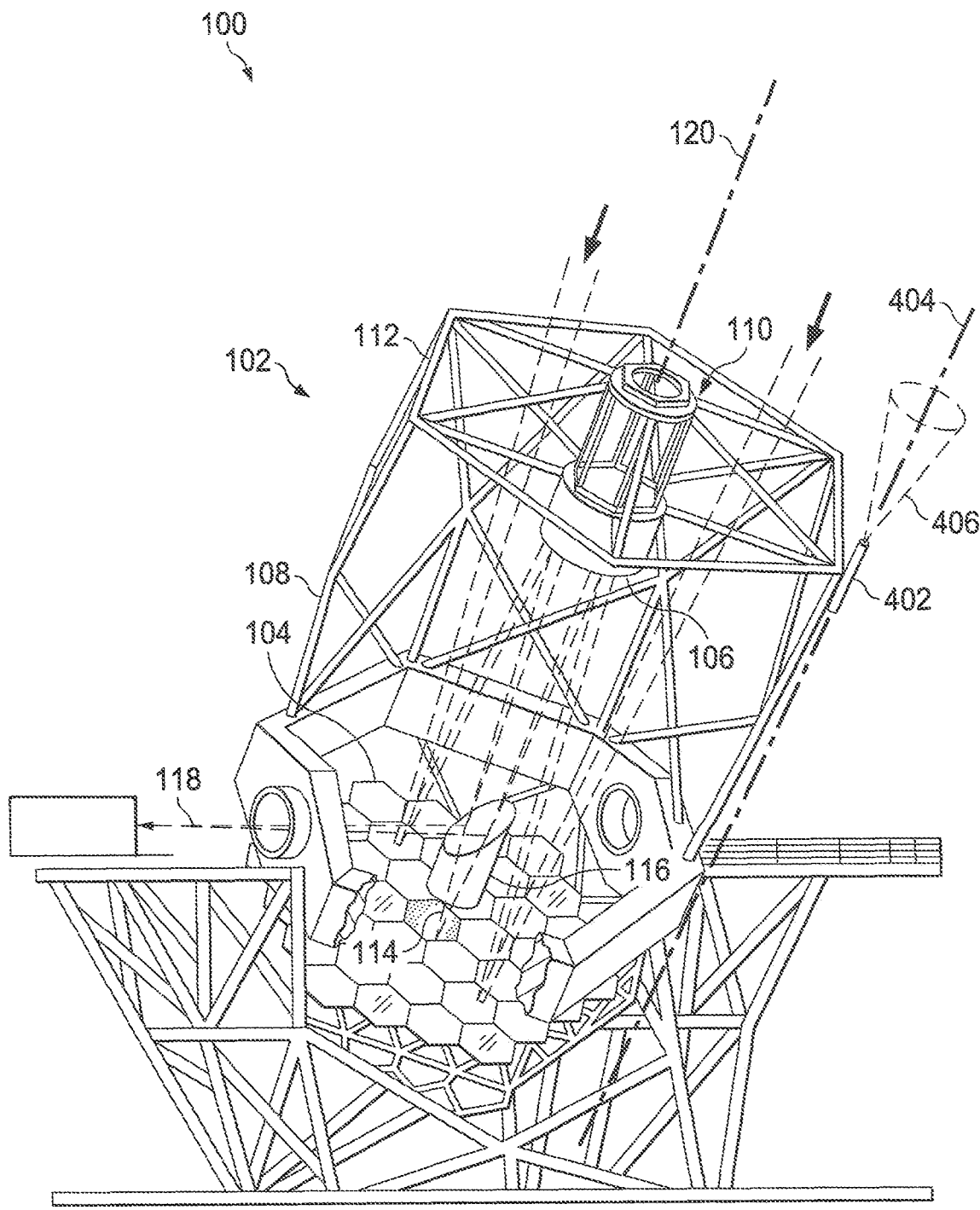

FIGS. 4A and 4B are diagrams presenting another embodiment of the optical surveillance system 100. In this embodiment, the optical surveillance system 100 further comprises a camera 402. The camera 402 has a line of sight 404 aligned to (colinear with) the optical axis 120 of the primary mirror 104 to view at least ±5° of the sky from the telescope line-of-sight 120. In one embodiment, the camera line-of-sight 404 is aligned to the optical axis 120 of the primary mirror too much closer tolerances, for example within well less than 1°. The camera 402 has a field of view much greater than that of the telescope 102, for example, a field of view of ±60°.

In one embodiment, the camera 402 is sensitive in the near infrared (NIR) from 700-900 nm wavelength, or in the short wave infrared (SWIR) from 1000-1700 nm. The use of a SWIR camera gives better visibility in degraded weather conditions, and in the presence of significant solar background.

In one embodiment, the camera 402 is protected by a glass cover that is opaque so as to block the preponderance of solar radiation, so that the camera 402 can see the sun without damage. This function can be provided by the cover 302, or a cover placed only over the camera 402. The camera 402 is also communicatively coupled to processor 124, to provide images and other information from the camera 402 to the processor 124, and optionally to provide commands from the processor 124 to the camera 402.

The camera 402 is used for several purposes. First, it is used to assess clear-sky locations where objects of interest might be found. This enables optimal tasking against a list of potential objects of interest. Here, the camera 402 is used to assess atmospheric transmission and atmospheric turbulence characterized by observing stars across the field of view (FOV) of the telescope 102 to estimate the strength of the turbulence in the direction of the stars. The atmospheric transmission is measured by comparing the apparent brightness of each observed star to its known brightness. An atmospheric turbulence $r_0$ parameter is measured by measuring the high-frequency jitter and/or apparent size of the star. These two measurements can also be used to support assessment of clear-sky or good-sky conditions. It should be noted that operation in the NIR and/or SWIR will allow stars to be seen during the daytime.

Figure 5:
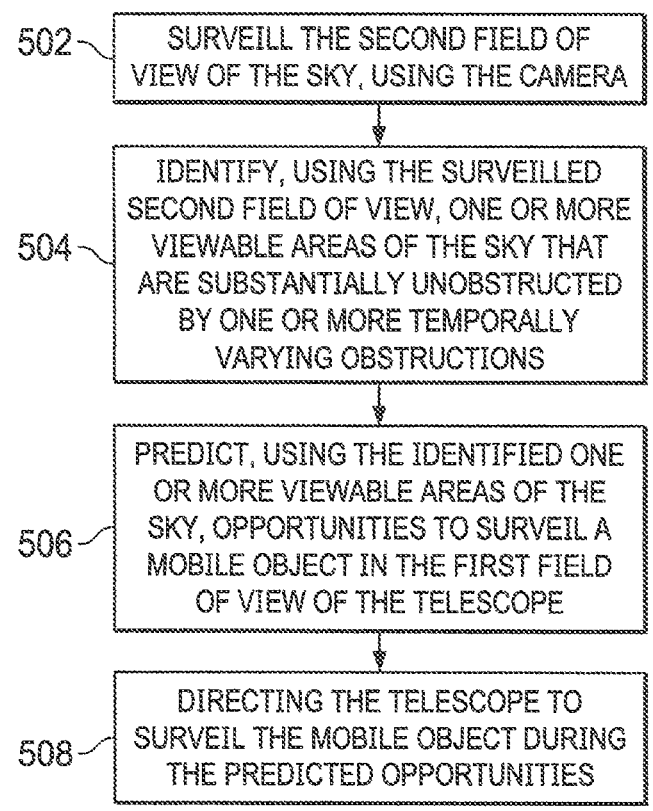
FIG. 5 is a diagram illustrating one embodiment of how the camera can be used to improve the performance of the optical surveillance system by predicting surveillance opportunities.

FIG. 5 is a diagram illustrating one embodiment of how the camera 402 can be used to improve the performance of the optical surveillance system 100 by predicting surveillance opportunities. In block 502, the camera 402 is used to surveil the sky for stars and other objects within the field of view 406 of the camera 402. In one embodiment, the sky is surveilled to find stars that comply with the good-sky conditions described above. Next, in block 504, one or more viewable areas of the sky that are substantially unobstructed by one or more temporally varying obstructions (such as clouds) is identified using camera 402 to survey the whole field of view 406. In this context, "substantially unobstructed" refers to conditions of clear-sky or good-sky conditions. In block 506, opportunities to surveil the mobile object in the first field of view of the telescope 102 are predicted using the identified one or more viewable areas of the sky. This can be accomplished, for example by predicting a path of the mobile object, predicting a path and angular extent (e.g. the shape) of the one or more viewable areas of the sky, and predicting the opportunities to surveil the mobile object in the first field of view of the telescope from the path of the mobile object and the path and angular extent of the one or more viewable areas of the sky. The path and angular extent of the one or more viewable areas of the sky can be predicted, for example, using weather prediction algorithms, or data obtained from sources such as the National Oceanic and Atmospheric Administration (NOAA). Finally, in block 508, the telescope 102 is directed to surveil the mobile object using the predicted opportunities.

The camera 402 can also be used to track stars accurately and at high bandwidth, to allow real-time jitter correction in the presence of wind, thus permitting mitigation of wind effects. The outputs of this camera 402 can be used to control the small, potentially fast-moving secondary mirror 106, a primary mirror 104 segment, or another small fast-moving mirror further down in the beam train to compensate for either jitter for atmospheric turbulence.

Figure 6:
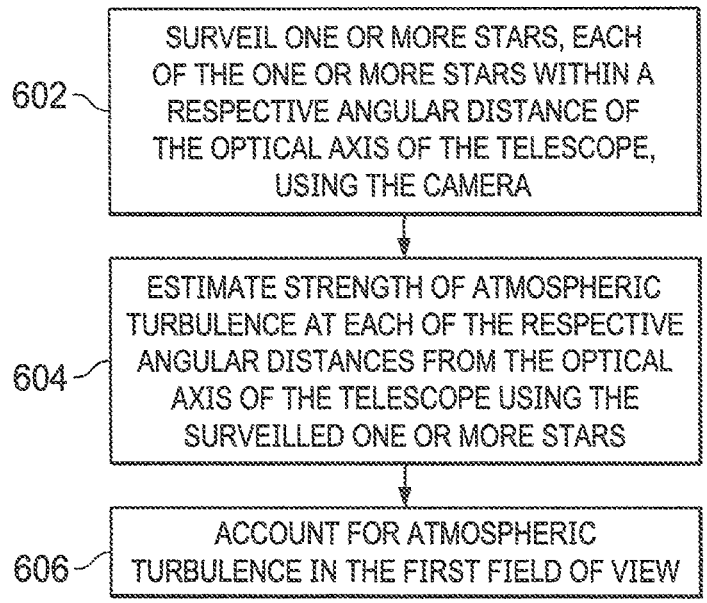
FIG. 6 is a diagram illustrating one embodiment of how the camera can be used to improve the performance of the optical surveillance system by accounting for atmospheric turbulence.

FIG. 6 is a diagram illustrating one embodiment of how the camera 402 can be used to improve the performance of the optical surveillance system 100 by estimating the strength of atmospheric turbulence. In block 602, one or more stars within a respective angular distance of the optical axis 120 of the telescope 102 are surveilled using the camera 402. In block 604 the strength of the atmospheric turbulence at each of the respective angular distances from the optical axis 120 of the telescope 102 is estimated using the surveilled one or more stars. In block 606, estimated atmospheric turbulence in the direction of observations made with the telescope 102 is accounted for in such observations, for example, to select areas with clear sky or good sky conditions for observations.

Figure 7:
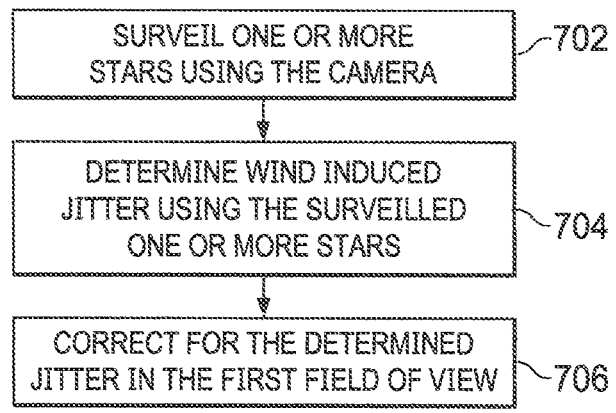
FIG. 7 is a diagram illustrating one embodiment of how the camera can be used to improve the performance of the optical surveillance system by accounting for wind-induced jitter.

FIG. 7 is a diagram illustrating an embodiment of how the camera 402 can be used to improve the performance of the optical surveillance system 100 by helping to account for wind induced jitter. In block 702, the camera 402 is used to survey one or more stars. In block 704, the wind-induced jitter is determined using the surveilled one or more stars. Finally, in block 706 the determined jitter is corrected for in the first field of view of the telescope 102 to mitigate wind effects. The outputs of this camera 402 can be used to control a small, potentially fast-moving secondary mirror (e.g. one or more of the elements of mirror 104 or another small fast-moving mirror further down in the beam train.

The camera 402 can be placed in a number of different locations on the optical surveillance system 100. In the embodiment illustrated in FIG. 4A, the camera 402 is disposed behind the secondary mirror 106 of the telescope 102 (e.g. on the side of the secondary mirror 106 facing away from the primary mirror 104), and below the front cover 302. FIG. 4B is a diagram illustrating another embodiment, in which the camera 402 is disposed on an exterior surface of the trestle of the support structure 108. The camera 402 may be disposed inside the cover 202 illustrated in FIG. 2, or the location outside of the cover 202.

External Positive-Pressure Flow

Figure 8:
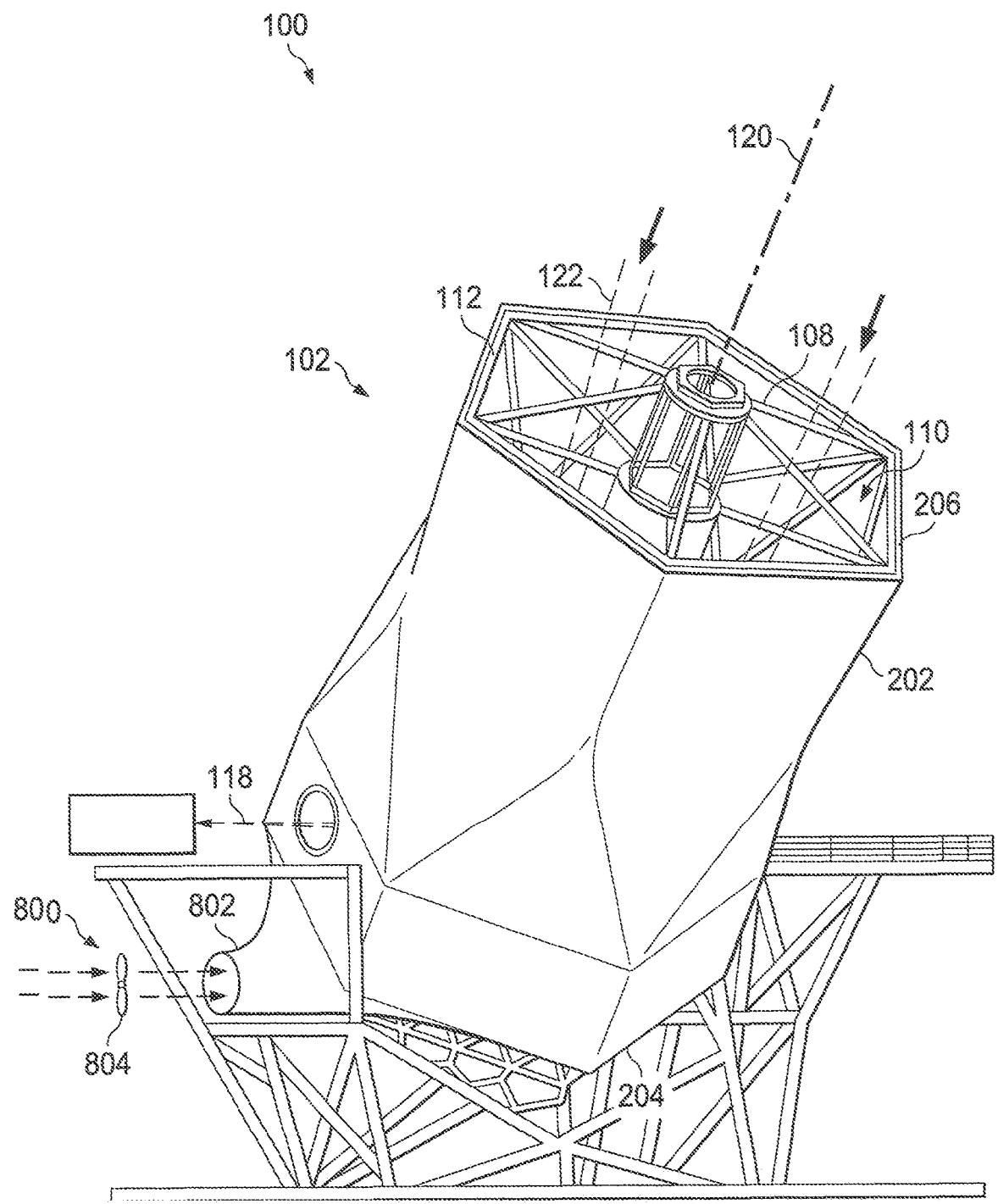
FIG. 8 is a diagram depicting other embodiments of the optical surveillance system.

FIG. 8 is a diagram depicting other embodiments of the optical surveillance system 100. In this embodiment, the optical surveillance system 100 includes a ventilation system 800, pneumatically coupled to an interior volume of the first cover 202. The ventilation system 800 comprises a cowling 802 having one end that pneumatically couples to the interior volume of the first cover 202, and a second end having a source of pressure, such as a fan 804 for moving air from an exterior volume of the cover 202, to the interior volume of the cover 202. Thus, the ventilation system 800 creates greater air pressure within the interior volume of the first cover 202 than exterior to the first cover 202. This permits air pressure to be vented from the interior volume of the first cover 202 to exterior of the first cover 202 primarily in the region of the first cover 202 proximate the primary mirror 104. This flow maintains a near-constant, athermal or near-uniform temperature inside the telescope 102 structure. This flow can be implemented by adding the air in the vicinity of the bottom of the telescope 102 path. This avoids the "chimney effect" of turbulence within the telescope 102 structure and the beam path 122 below it. This flow exits the telescope 102 primarily at the bottom of the external cover 202 and near the primary mirror 104, where the temperature differences will not cause turbulent aberrations in the line-of-sight. Such a flow also reduces the overall cost of the telescope 102 design, since many telescopes need athermal optical designs for the main optical path 122 and for auxiliary optical system systems, and this flow will introduce temperature control which eliminates the needs for such designs.

The ventilation system 800 helps to improve the uniformity of temperature and density of the air between the primary mirror 104 and secondary mirror 106. This addresses a significant issue related to telescope "seeing," greatly reducing a significant source of aberrations. Also, it keeps the secondary trusses of the support structure 108 at a relatively uniform temperature, which is of further benefit.

Estimated Benefits

To estimate the combined benefits of all the above mitigations, one can estimate the following for a typical optical system that looks towards the sky. For a typical good observational site, nighttime operation only is typical, reducing availability by approximately 50% on average over a year. For such a site, high humidity might limit operations 20% of the time, high clouds 10% of the time, and high wind 10% of the time, and rain 30% of the time that it would be otherwise available. Assuming all these effects are uncorrelated, the net availability of such an optical system is summarized in Table 1. Obviously, the above conditions limit the persistence and availability of such a system. When the above mitigations are applied, it is estimated that availability could be increased to almost 60%.

TABLE I

| Effect | Availability Without Mitigation (%) | Availability With Mitigation (%) | Comments |
| --- | --- | --- | --- |
| Sky background | 50% | 90% | Solar exclusion a limit |
| Humidity | 80 | 95 | Ground fog a limit |
| High Clouds | 90 | 98 | Ability to utilize holes in clouds |
| High Wind | 90 | 95 | Greater tolerance of wind-induced jitter |
| Rain and Drizzle | 70 | 75 | Operations in light rain with partial cloud cover |
| Total Availability | 22.7% | 59.7% | Estimated factor of 2.6 improvement |

Hardware Environment

Figure 9:
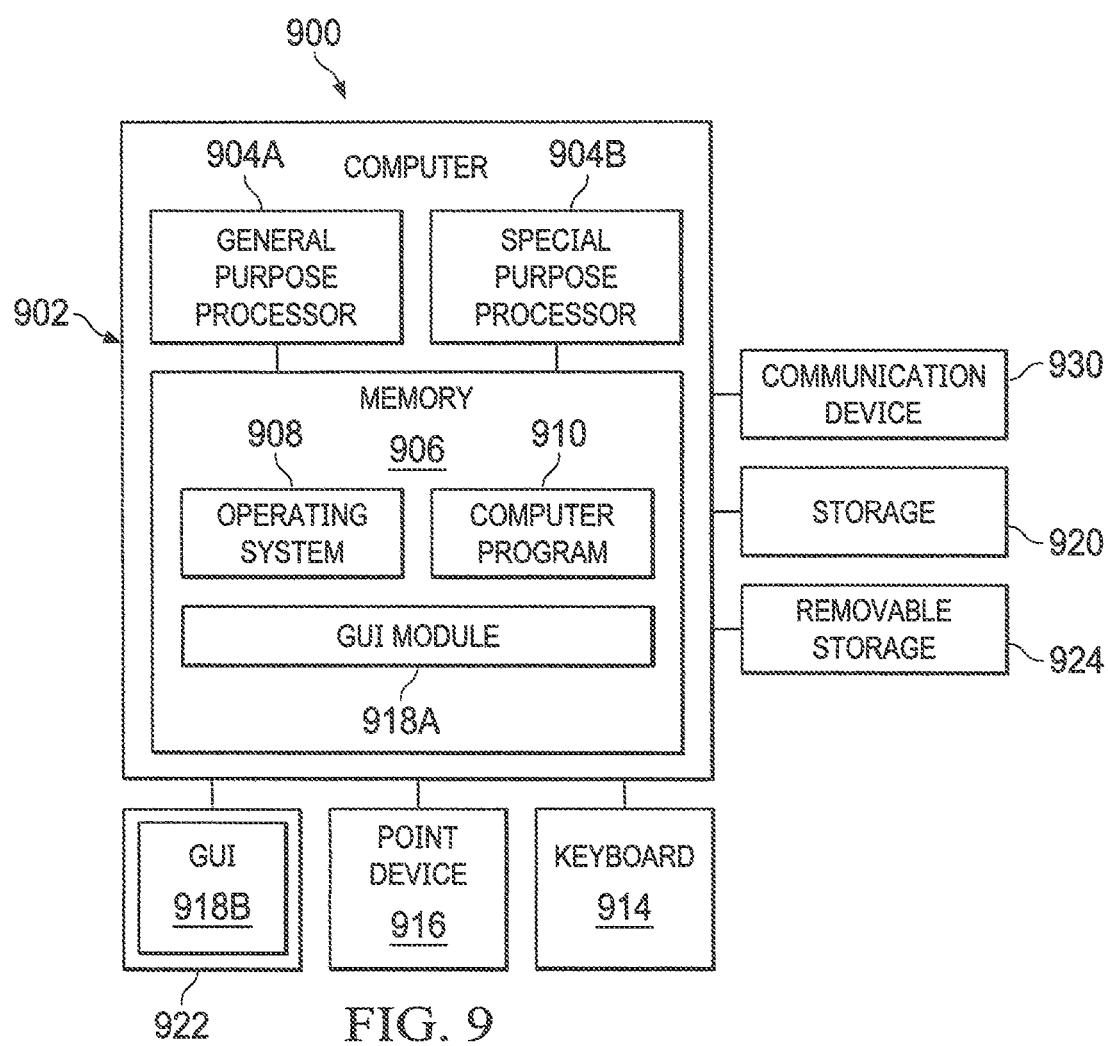
FIG. 9 is a diagram illustrating an exemplary processing system that could be used to implement processing elements of the optical surveillance system.

FIG. 9 illustrates an exemplary computer system 900 that could be used to implement processing elements of the above disclosure, including the system processor 124. A computer 902 comprises a processor 904 and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The application 910 accesses and manipulates data stored in the memory 906 of the computer 902. The computer 902 also optionally comprises an external communication device such as a modem, satellite link, Ethernet card, or other device for communicating with other computers.

In one embodiment, instructions implementing the operating system 908, the computer program 910, are tangibly embodied in a computer-readable medium, e.g., data storage device 920, which could include one or more fixed or removable data storage devices 924 Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

The foregoing discloses an optical surveillance system, including: a primary mirror; a secondary mirror; a support structure extending between the primary mirror and the secondary mirror, the support structure retaining the secondary mirror along an optical axis of the primary mirror, the support structure including a head ring disposed proximate to an aperture of the optical surveillance system; and a flexible first cover affixed to the support structure, the cover having a first end at least partially sealingly disposed around a periphery of the primary mirror and a second end at least partially sealingly disposed around the head ring.

Implementations may include one or more of the following features:

Any of the systems described above, wherein: the support structure includes a trestle frame disposed about the optical axis of the primary mirror, and the cover is affixed to an external surface of the trestle frame axially about the frame.

Any of the systems described above, wherein: the cover is at least partially composed of a substantially opaque, thermally insulating fabric having a diffusively reflective outer surface and an optically absorbing inner surface.

Any of the systems described above, wherein: the cover includes a plurality of substantially opaque, thermally insulating plates having a diffusely reflective outer surface and an optically absorbing inner surface, each plate affixed to the support structure.

Any of the systems described above, further including: an optically transparent second cover, disposed at the first end of the first cover.

Any of the systems described above, wherein the optically transparent second cover is substantially sealingly disposed at the first end of the first cover to prevent flow of air from within the first cover to an external environment of the optical surveillance system.

Any of the systems described above, wherein the second cover is included of optically uniform plate glass.

Any of the systems described above, further including an anti-reflective coating on an outer surface of the uniform plate glass and an inner surface of the uniform plate glass.

Any of the systems described above, further including a hydrophobic coating on the outer surface of the uniform plate glass. The system wherein the uniform plate glass is auto dimming at solar wavelengths.

Any of the systems described above, further including: a ventilation system, pneumatically coupled to an interior volume of the first cover, the ventilation system for creating greater air pressure within the interior volume of the first cover than a volume exterior to the first cover; and wherein air pressure is vented from the interior volume to an exterior of the first cover in a region of the first cover proximate to the primary mirror.

Any of the systems described above, further including: a camera, disposed on a side of the secondary mirror facing away from the primary mirror, the camera having line of sight aligned to the optical axis of the primary mirror.

Any of the systems described above, wherein: the camera is disposed between the second cover and the secondary mirror. The system wherein: the camera has a line of sight aligned to the optical axis of the primary mirror to within 5 degrees; and the camera has a field of view of at least 60 degrees.

Any of the systems described above, wherein: the camera is sensitive in near infrared or short wave infrared wavelengths. The system may also include the camera has a second cover, substantially optically opaque to solar radiation.

Any of the systems described above, wherein: the primary mirror, the secondary mirror, and the support structure together include a telescope having a first field of view. The system may also include the camera includes a second field of view greater than the first field of view; the system further includes:

Another embodiment is evidenced by a system having a processor and a memory, communicatively coupled to the processor. The memory stores processor instructions including processor instructions for: surveilling the second field of view of the sky, using the camera; identifying, using the surveilled second field of view, one or more viewable areas of the sky that are substantially unobstructed by one or more temporally varying obstructions; predicting, using the identified one or more viewable areas of the sky, opportunities to surveil a mobile object in the first field of view of the telescope; and directing the telescope to surveil the mobile object during the predicted opportunities.

Implementations may include one or more of the following features:

Any of the systems described above, wherein the instructions for predicting opportunities to surveil a mobile object in the first field of view of the telescope include instructions for: predicting a path of the mobile object.

Any of the systems described above, wherein the instructions further include instructions for predicting a path and angular extent of the one or more viewable areas of the sky.

Any of the systems described above, wherein the instructions include instructions for predicting the opportunities to surveil the mobile object in the first field of view of the telescope from the path of the mobile object and the path and angular extent of the one or more viewable areas of the sky.

Any of the systems described above, wherein predicting the path and angular extent of the one or more viewable areas of the sky includes predicting a path and shape of the one or more viewable areas of the sky.

Any of the systems described above, wherein: the primary mirror, the secondary mirror, and the support structure together include a telescope having a first field of view.

Any of the systems described above, wherein the camera includes a second field of view greater than the first field of view; the system further includes:

Still another embodiment is evidenced by a system having a processor; a memory, communicatively coupled to the processor, the memory storing processor instructions including processor instructions for: surveilling one or more stars, each of the one or more stars within a respective angular distance of the optical axis of the telescope, using the camera; estimating a strength of atmospheric turbulence at each of the respective angular distances from the optical axis of the telescope using the surveilled one or more stars; and accounting for the estimated atmospheric turbulence in the first field of view.

Implementations may include one or more of the following features:

Any of the systems described above, wherein: the primary mirror, the secondary mirror, and the support structure together include a telescope having a first field of view; the camera includes a second field of view greater than the first field of view; the system further includes: a processor; a memory, communicatively coupled to the processor, the memory storing processor instructions including processor instructions for: surveilling one or more stars using the camera; determining wind induced jitter using the surveilled one or more stars; and compensating for the determined jitter in the first field of view.

Another embodiment is evidenced by a method of performing surveillance with an optical surveillance system, the optical surveillance system including a telescope having a primary mirror, a secondary mirror, a support structure extending between the primary mirror and the secondary mirror, and a camera having an optical axis aligned with an optical axis of the telescope, the telescope having a first field of view and the camera having a second field of view greater than the first field of view, the method including: surveilling the second field of view of the sky, using the camera; identifying, using the surveilled second field of view, one or more viewable areas of the sky that are substantially unobstructed by one or more temporally varying obstructions; and predicting, using the identified one or more viewable areas of the sky, opportunities to surveil a mobile object in the first field of view of the telescope; and directing the telescope to surveil the mobile object during the predicted opportunities.

Another embodiment is evidenced by a method of performing surveillance with an optical surveillance system, the optical surveillance system including a telescope having a primary mirror, a secondary mirror, a support structure extending between the primary mirror and the secondary mirror, and a camera having an optical axis aligned with an optical axis of the telescope, the telescope having a first field of view and the camera having a second field of view greater than the first field of view, the method including: surveilling one or more stars, each of the one or more stars within a respective angular distance of the optical axis of the telescope, using the camera; estimating a magnitude of atmospheric turbulence at each of the respective angular distances from the optical axis of the telescope using the surveilled one or more stars; and accounting for the estimated magnitude of the atmospheric turbulence atmospheric turbulence in the first field of view.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:
1. An optical surveillance system, comprising:
a primary mirror;
a secondary mirror;
a support structure extending between the primary mirror and the secondary mirror, the support structure retaining the secondary mirror along an optical axis of the primary mirror, the support structure comprising a head ring disposed adjacent to the secondary mirror; and
a flexible first cover, between the primary mirror and the secondary mirror, affixed to the support structure, the first cover having a first end at least partially sealingly disposed around a periphery of the primary mirror and a second end at least partially sealingly disposed around the head ring.

2. The system of claim 1, wherein:
the support structure comprises a trestle frame disposed about the optical axis of the primary mirror, and the cover is affixed to an external surface of the trestle frame axially about the trestle frame.

3. The system of claim 2, wherein:
the cover is at least partially composed of a substantially opaque, thermally insulating fabric having a diffusively reflective outer surface and an optically absorbing inner surface.

4. The system of claim 2, wherein:
the cover comprises a plurality of substantially opaque, thermally insulating plates having a diffusely reflective outer surface and an optically absorbing inner surface, each plate affixed to the support structure.

5. The system of claim 1, further comprising:
an optically transparent second cover, disposed at the first end of the flexible first cover.

6. The system of claim 5, wherein the optically transparent second cover is substantially sealingly disposed at the first end of the flexible first cover to prevent flow of air from within the flexible first cover to an external environment of the optical surveillance system.

7. The system of claim 5, wherein the second cover is comprised of optically uniform plate glass.

8. The system of claim 7, further comprising an anti-reflective coating on an outer surface of the plate glass and an inner surface of the plate glass.

9. The system of claim 8, further comprising a hydrophobic coating on the outer surface of the plate glass.

10. The system of claim 7, wherein the plate glass is auto dimming at solar wavelengths.

11. The system of claim 1, further comprising:
a ventilation system, pneumatically coupled to an interior volume of the first cover, the ventilation system for creating greater air pressure within the interior volume of the first cover than a volume exterior to the first cover.

12. The system of claim 11, wherein:
the ventilation system comprises a fan drawing air from the exterior volume of the first cover to the interior volume of the first cover.

13. The system of claim 1, further comprising:
a camera, disposed on a side of the secondary mirror facing away from the primary mirror, the camera having line of sight aligned to the optical axis of the primary mirror.

14. The system of claim 13, wherein:
the camera is disposed between a second cover, disposed at the first end of the flexible first cover, and the secondary mirror.

15. The system of claim 14, wherein:
the camera has a line of sight aligned to the optical axis of the primary mirror to within 5 degrees; and
the camera has a field of view of at least 60 degrees.

16. The system of claim 14, wherein:
the camera is sensitive in near infrared or short wave infrared wavelengths; and
the camera has a second cover, substantially optically opaque to solar radiation.

17. The system of claim 13, wherein:
the primary mirror, the secondary mirror, and the support structure together comprise a telescope having a first field of view;
the camera comprises a second field of view greater than the first field of view;
the system further comprises:
a processor;
a memory, communicatively coupled to the processor, the memory storing processor instructions including processor instructions for:
surveilling the second field of view of the sky, using the camera;
identifying, using the surveilled second field of view, one or more viewable areas of the sky that are substantially unobstructed by one or more temporally varying obstructions;
predicting, using the identified one or more viewable areas of the sky, opportunities to surveil a mobile object in the first field of view of the telescope; and
directing the telescope to surveil the mobile object during the predicted opportunities.

18. The system of claim 17, wherein the instructions for predicting opportunities to surveil a mobile object in the first field of view of the telescope comprise instructions for:
predicting a path of the mobile object;
predicting a path and angular extent of the one or more viewable areas of the sky; and
predicting the opportunities to surveil the mobile object in the first field of view of the telescope from the path of the mobile object and the path and angular extent of the one or more viewable areas of the sky.

19. The system of claim 18, wherein predicting the path and angular extent of the one or more viewable areas of the sky comprises predicting a path and shape of the one or more viewable areas of the sky.

20. The system of claim 13, wherein:
the primary mirror, the secondary mirror, and the support structure together comprise a telescope having a first field of view; and
the camera comprises a second field of view greater than the first field of view;
the system further comprises:
a processor;
a memory, communicatively coupled to the processor, the memory storing processor instructions including processor instructions for:
surveilling one or more stars, each of the one or more stars within a respective angular distance of the optical axis of the telescope, using the camera;
estimating a strength of atmospheric turbulence at each of the respective angular distances from the optical axis of the telescope using the surveilled one or more stars; and
accounting for the estimated atmospheric turbulence in the first field of view.

21. The system of claim 13, wherein:
the primary mirror, the secondary mirror, and the support structure together comprise a telescope having a first field of view;
the camera comprises a second field of view greater than the first field of view;
the system further comprises:
a processor;
a memory, communicatively coupled to the processor, the memory storing processor instructions including processor instructions for:
surveilling one or more stars using the camera;
determining wind induced jitter using the surveilled one or more stars; and
compensating for the determined jitter in the first field of view.

22. A method of performing surveillance with an optical surveillance system, the optical surveillance system comprising:
- a telescope having a primary mirror and a secondary mirror,
- wherein the secondary mirror receives light from the primary mirror and reflects light to a focus of the telescope,
- a support structure extending between the primary mirror and the secondary mirror, and
- a camera having an optical axis aligned with an optical axis of the telescope, the telescope having a first field of view, associated with light received at the focus, and the camera having a second field of view greater than the first field of view, the method comprising:
  - surveilling the second field of view of the sky, using the camera;
  - identifying, using the surveilled second field of view, one or more viewable areas of the sky that are substantially unobstructed by one or more temporally varying obstructions;
  - predicting, using the identified one or more viewable areas of the sky, opportunities to surveil a mobile object in the first field of view of the telescope; and
  - directing the telescope to surveil the mobile object during the predicted opportunities.

23. A method of performing surveillance with an optical surveillance system, the optical surveillance system comprising:
- a telescope having a primary mirror,
- a secondary mirror,
- a support structure extending between the primary mirror and the secondary mirror, and
- a camera having an optical axis aligned with an optical axis of the telescope, the telescope having a first field of view and the camera having a second field of view greater than the first field of view, the method comprising:
  - surveilling one or more stars, each of the one or more stars within a respective angular distance of the optical axis of the telescope, using the camera;
  - estimating a magnitude of atmospheric turbulence, at each of the respective angular distances from the optical axis of the telescope, using the surveilled one or more stars; and
  - accounting for the estimated magnitude of the atmospheric turbulence in the first field of view.

* * * * *